United States Patent
Zheng et al.

(10) Patent No.: US 8,915,043 B2
(45) Date of Patent: Dec. 23, 2014

(54) BOLT CONNECTION FOR A WIND TOWER LATTICE STRUCTURE

(75) Inventors: Danian Zheng, Simpsonville, SC (US); William Francis Gevers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 437 days.

(21) Appl. No.: 13/115,530

(22) Filed: May 25, 2011

(65) Prior Publication Data

US 2012/0023864 A1 Feb. 2, 2012

(51) Int. Cl.
| | | |
|---|---|---|
| *E04H 12/00* | (2006.01) | |
| *E04C 3/08* | (2006.01) | |
| *E04H 12/10* | (2006.01) | |
| *F03D 11/04* | (2006.01) | |
| *F16B 5/02* | (2006.01) | |
| *E04C 3/04* | (2006.01) | |
| *F16B 19/02* | (2006.01) | |

(52) U.S. Cl.
CPC *E04C 3/08* (2013.01); *E04H 12/10* (2013.01); *F03D 11/04* (2013.01); *F16B 5/025* (2013.01); *E04C 2003/0495* (2013.01); *F05B 2240/9121* (2013.01); *F05B 2260/301* (2013.01); *F16B 19/02* (2013.01); *Y02B 10/30* (2013.01); *Y02E 10/728* (2013.01)
USPC ............. 52/651.01; 52/659.9; 52/40; 52/838; 52/849; 411/429

(58) Field of Classification Search
CPC ............. E04B 1/2403; F05B 2260/301; F16B 37/145; F16B 5/02
USPC ...................... 52/651.01, 656.9, 40, 838, 849; 411/429
See application file for complete search history.

(56) References Cited

U.S. PATENT DOCUMENTS

| | | |
|---|---|---|
| 1,939,598 A | 12/1933 | Ragsdale |
| 2,114,901 A | 4/1938 | Henderson |
| 3,429,092 A | 2/1969 | Perry et al. |
| 3,685,866 A | 8/1972 | Patenaude |
| 3,787,033 A | 1/1974 | Snyder et al. |
| 3,854,185 A | 12/1974 | Reid |
| 3,952,472 A | 4/1976 | Boehmig |
| 3,960,458 A | 6/1976 | Sato et al. |
| 3,989,396 A | 11/1976 | Matsumoto et al. |
| 3,989,399 A | 11/1976 | Slowbe |
| 4,014,089 A | 3/1977 | Sato et al. |
| 4,111,578 A | 9/1978 | Sato et al. |
| 4,310,273 A * | 1/1982 | Kirrish ......................... 411/338 |
| 4,330,221 A | 5/1982 | Stumm |
| 4,376,604 A * | 3/1983 | Pratt et al. ....................... 411/34 |

(Continued)

FOREIGN PATENT DOCUMENTS

WO    WO 2007/147793    12/2007

*Primary Examiner* — Chi Q Nguyen
(74) *Attorney, Agent, or Firm* — Dority & Manning, P.A.

(57) ABSTRACT

A bolt connection assembly is provided that is particularly suited for connecting components of a lattice structure wind tower. The assembly includes a pin component having a head and a shaft, with the shaft having a textured friction-fit outer circumferential surface. The shaft further includes a threaded internal bore. A bolt component having a threaded shaft engages within the threaded internal bore. In an assembled state of the pin component and bolt component, the threaded shaft has a free length section that extends into the threaded internal bore for increased distribution of a specified pretension of the bolt component.

4 Claims, 4 Drawing Sheets

(56) References Cited

U.S. PATENT DOCUMENTS

| | | |
|---|---|---|
| 4,490,083 A * | 12/1984 | Rebish .......................... 411/338 |
| 4,783,940 A | 11/1988 | Sato et al. |
| 4,905,436 A | 3/1990 | Matsuo et al. |
| 5,082,166 A | 1/1992 | Matsuo et al. |
| 5,310,298 A | 5/1994 | Hwang |
| 5,410,847 A | 5/1995 | Okawa et al. |
| 5,595,040 A | 1/1997 | Chen |
| 5,680,738 A | 10/1997 | Allen et al. |
| 5,685,662 A | 11/1997 | Rollin et al. |
| 6,059,482 A | 5/2000 | Beauvoir |
| 6,073,405 A | 6/2000 | Kasai et al. |
| 6,138,427 A | 10/2000 | Houghton |
| 6,219,989 B1 | 4/2001 | Tumura |
| 6,415,462 B1 * | 7/2002 | Perry ................................ 4/614 |
| 6,427,393 B1 | 8/2002 | Chen et al. |
| 6,516,583 B1 | 2/2003 | Houghton |
| 6,591,573 B2 | 7/2003 | Houghton |
| 6,705,814 B2 * | 3/2004 | Dobson ........................ 411/533 |
| 6,754,044 B1 * | 6/2004 | Braunheim et al. ....... 360/244.6 |
| 7,127,863 B2 | 10/2006 | Simmons |
| 7,204,667 B2 | 4/2007 | Uno |
| 7,555,818 B2 * | 7/2009 | Erskine et al. .................. 24/305 |
| 8,046,967 B2 * | 11/2011 | Suare et al. ................. 52/506.06 |
| 8,393,118 B2 * | 3/2013 | Fang et al. .................... 52/167.1 |
| 2004/0134161 A1 * | 7/2004 | Lockwood et al. .......... 52/736.1 |
| 2004/0211140 A1 | 10/2004 | Suzuki et al. |
| 2006/0272244 A1 | 12/2006 | Jensen |
| 2008/0078083 A1 * | 4/2008 | Livingston et al. ........ 29/897.31 |
| 2008/0256892 A1 | 10/2008 | Franke |
| 2010/0180533 A1 | 7/2010 | Spiegel et al. |
| 2010/0242406 A1 | 9/2010 | Oliphant et al. |
| 2012/0131877 A1 * | 5/2012 | Fang et al. ................. 52/651.09 |

* cited by examiner

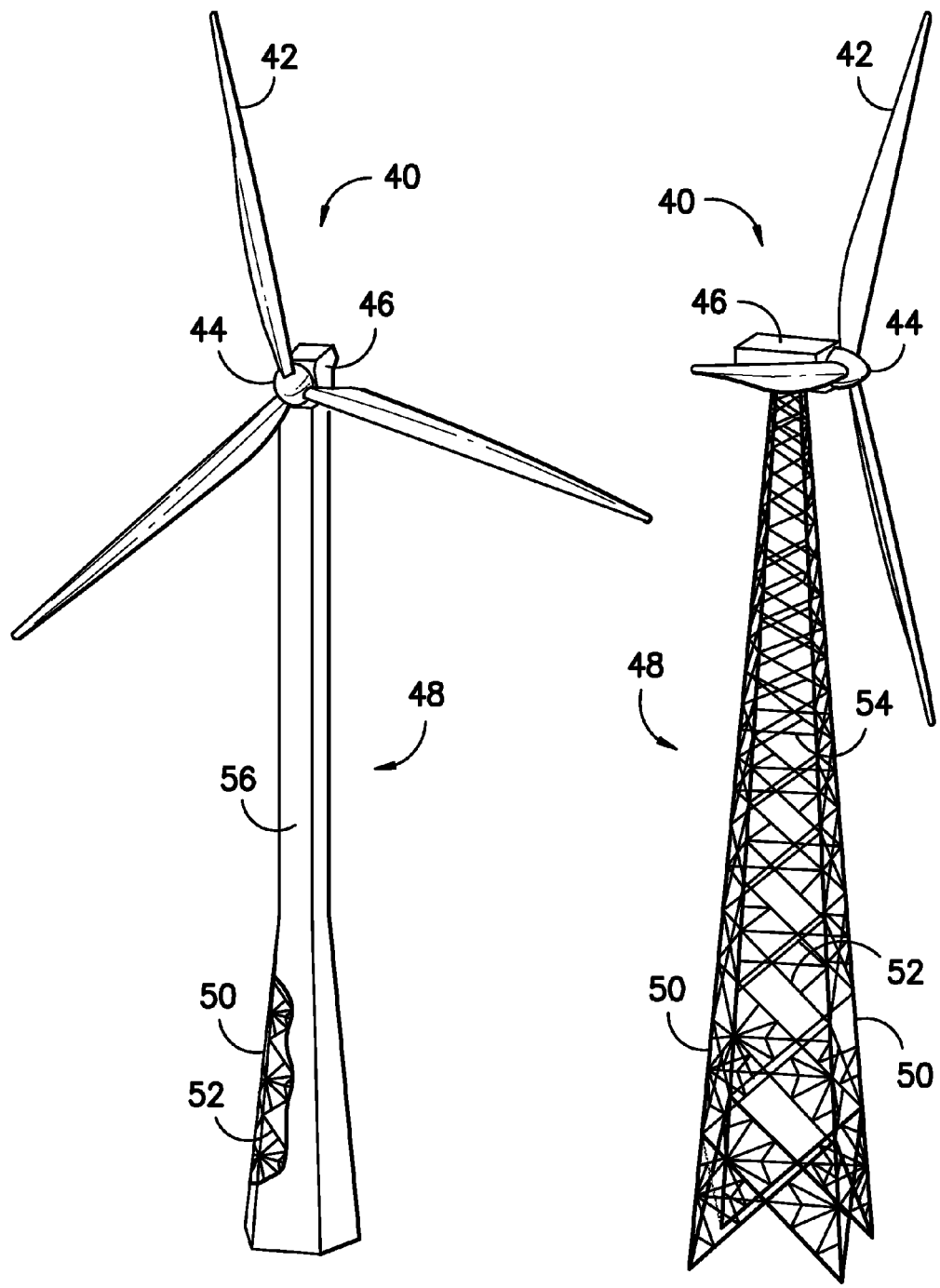
FIG. -1-    FIG. -2-

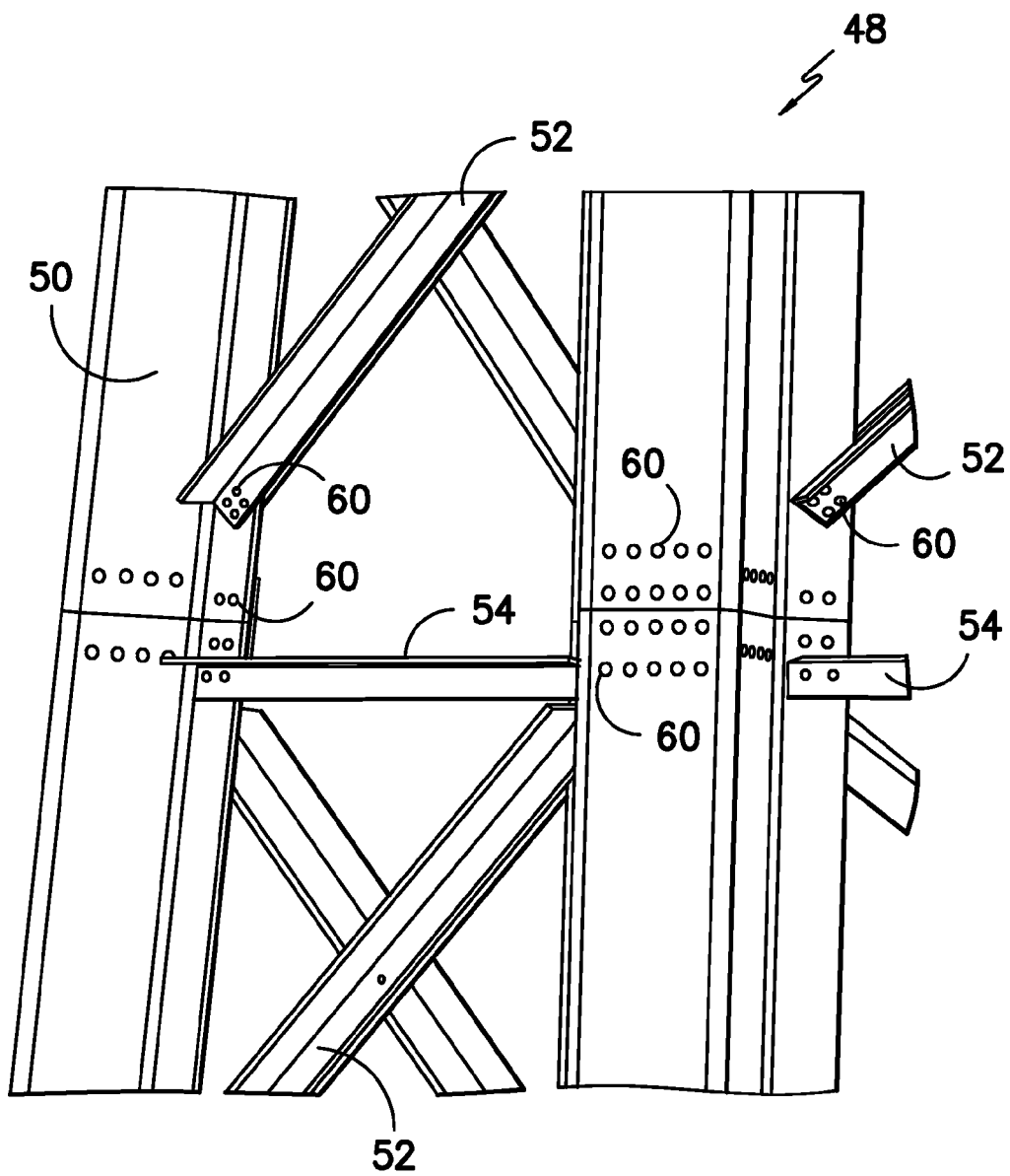
FIG. -3-

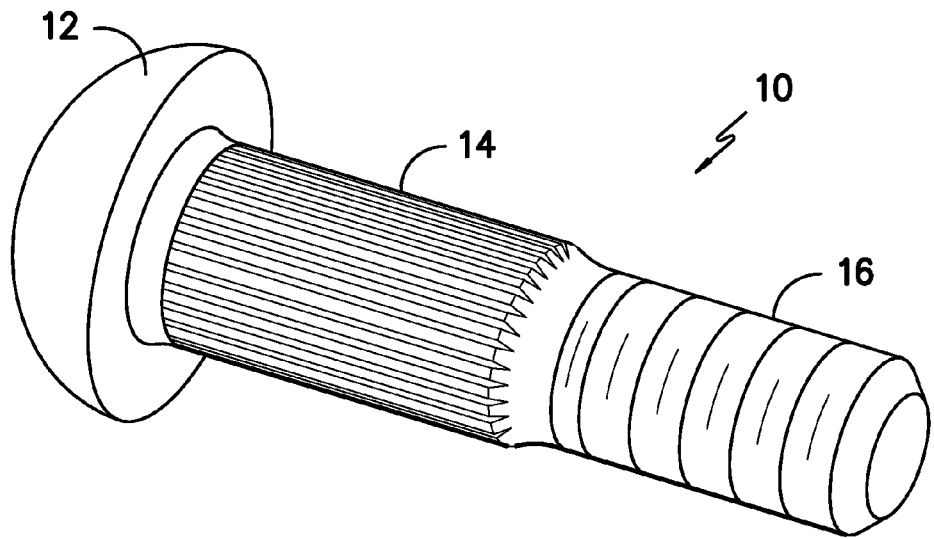
FIG. -4-
(PRIOR ART)
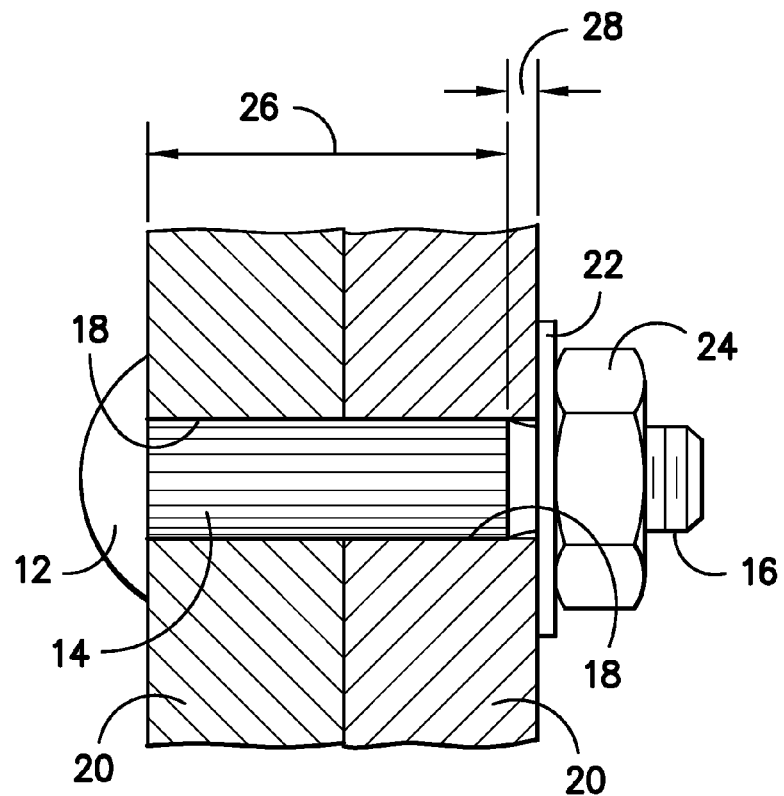
FIG. -5-
(PRIOR ART)

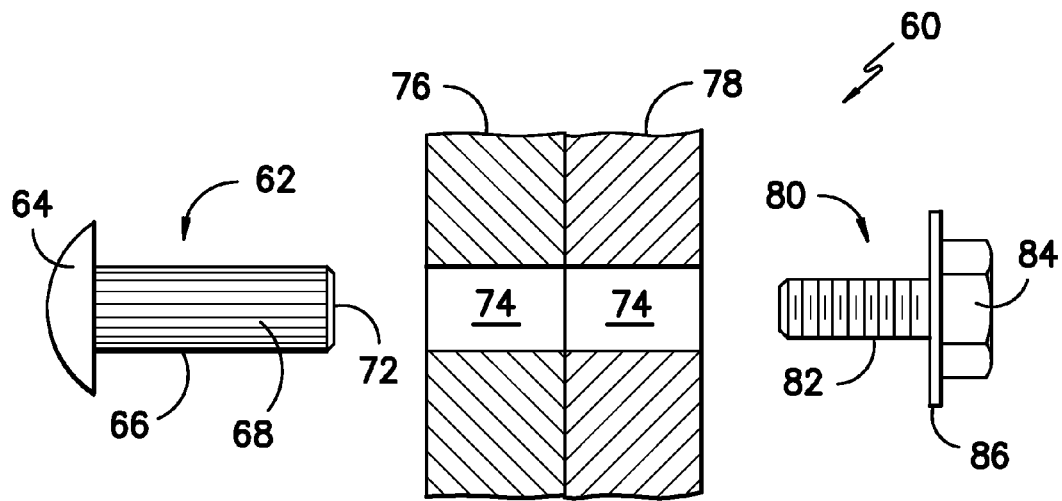
FIG. -6-
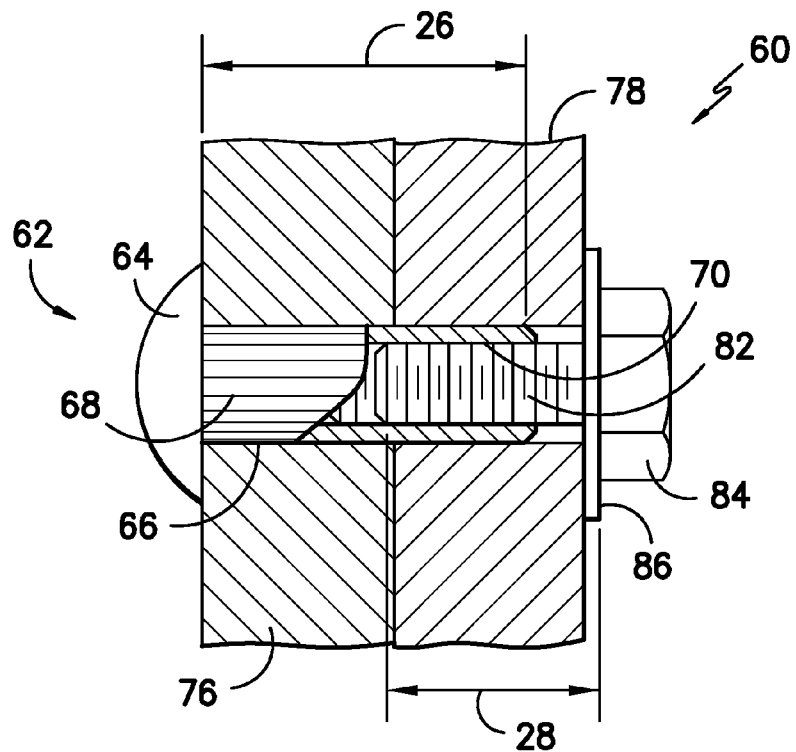
FIG. -7-

BOLT CONNECTION FOR A WIND TOWER LATTICE STRUCTURE

FIELD OF THE INVENTION

The present invention relates generally to wind turbine tower structures, and more particularly to an improved bolt connection for lattice tower structures.

BACKGROUND OF THE INVENTION

Conventional wind turbine towers typically include a tubular pole or a lattice structure to support a wind turbine at a considerable height to capture wind energy. The tubular pole configuration is relatively more simple and easier to assemble than the lattice structure. However, tubular poles use more steel than the lattice structure, resulting in a cost disadvantage with rising prices of steel. The lattice structure uses less steel, yet is relatively more complex due to numerous joints. These joints increase construction time and present possible locations for wear and maintenance. For example, vibration caused by wind against the wind turbine tower can loosen bolted connections over time. The bolted connections may be replaced with arc welded joints. Unfortunately, arc welded joints also may have drawbacks.

A known bolt connection used in lattice tower structures is depicted in FIGS. 4 and 5. With this configuration, the bolt 10 has a threaded end section 16 and a larger diameter chamfered shaft section 14. The threaded end section 16 is engaged by a washer 22 and nut 24 in the connected state of the bolt connection. The chamfered shaft section 14 lies between the bolt head 12 and the threaded end section 16 and engages in a relatively tight friction fit within aligned through holes 18 in the connected lattice components 20. Although this bolt configuration provides a relatively good balance between strength and maintenance, because of the length 26 of the interference fit between the chamfered shaft section 14 and through holes 18, there is little free length (pretension length) 28 left on the shaft to be stretched to achieve the nut pretension requirement. Lack of pretension may result in early failure of the nut contact and subsequent loosening of the bolt-nut combination.

Accordingly, an improved bolt connection configuration is desirable that provides the strength and maintenance aspects of the prior art bolt connection of FIGS. 4 and 5 while providing increased pretension length along the bolt shaft.

BRIEF DESCRIPTION OF THE INVENTION

Aspects and advantages of the invention will be set forth in part in the following description, or may be obvious from the description, or may be learned through practice of the invention.

In accordance with aspects of the invention, a bolt connection assembly is provided that is particularly well-suited for connecting components of a lattice structure wind tower. The bolt connection assembly is not, however, limited to this use and may have utility in any environment or application, for example in building or bridge structures wherein the unique benefits of the bolt connection assembly would be advantageous. The bolt connection assembly includes a pin component having a head and a shaft, with the shaft having a textured friction-fit outer circumferential surface, such as a chamfered surface that produces an interference fit with a hole through which the pin component is inserted. The shaft further includes a threaded internal bore. The assembly includes a bolt component having a threaded shaft that engages within the threaded internal bore. In an assembled state of the pin component and the bolt component, the threaded shaft has a free length section that extends into the threaded internal bore of the pin component for an increased distribution of a specified pretension of the bolt component.

In a particular embodiment, the terminal end of the pin component shaft is defined by the end of the textured shaft section and inlet of the threaded internal bore such that no other type of shaft sections extend beyond the threaded internal bore. The distal end of the bore section is spaced from the head of the bolt component in an assembled state of the components to a sufficient degree to provide sufficient exposed bolt length for a defined pretension deformation.

It should be understood that the pin component shaft, internal bore, and the bolt component threaded shaft ay have various dimensions as a function of the size of the structural members intended to be assembled by the bolt connection, specified load and desired degree of pretension deformation, and so forth. The invention is not limited to any particular dimensions of the respective components.

The present invention also encompasses any manner of a wind turbine lattice tower structure having a plurality of structural members, such as legs and braces, connected together to define an open lattice tower. A plurality of bolt connection assemblies in accordance with aspects of the invention are provided at the connection junctures of the structural members.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine with a lattice tower structure;

FIG. 2 is a perspective view of an alternative embodiment of a wind turbine with a lattice tower structure;

FIG. 3 is a detailed perspective view of structural components of a wind turbine lattice tower structure particularly illustrating bolt connections assemblies at the connection junctures of the components;

FIG. 4 is a perspective view of a bolt component of a prior art connection assembly;

FIG. 5 is a side cut-away view of a prior art connection assembly using the bolt component of FIG. 4;

FIG. 6 is a component view of an embodiment of a bolt connection assembly in accordance with aspects of the invention; and, FIG. 7 is a side cut-away view of the bolt connection assembly of FIG. 6.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 are perspective views of exemplary wind turbines 40. The wind turbines 40 include a plurality of blades 42 mounted to a rotor hub 44, which in turn is rotationally supported any manner of power generation components housed within a nacelle 46, as is well known in the art. The nacelle 46 is supported atop a tower structure 48, which in the illustrated embodiments is an open lattice structure formed by legs 50, horizontal braces 54, and diagonal braces 52. The legs 50 are typically angle iron members or pipe members, and the braces 52, 54 are typically angle iron members. These lattice frame tower structures 48 are also referred to in the art as "space frame" towers. The lattice tower structure 48 may be fabricated in sections and erected at the wind turbine site.

In the embodiment of FIG. 1, a cladding material 56 is applied over the lattice structure, which may be any type of suitable fabric, such as an architectural fabric designed for harsh weather conditions. The cladding 56 protects workers and equipment within the tower and provides an aesthetic appearance to the wind turbine 40.

FIG. 3 is a more detailed view of components of the lattice structure tower 48, and particularly illustrates the connection locations between the braces 52, 54 and the legs 50, as well as between aligned sections of the legs 50. A plurality of bolt connections 60 are utilized at these various connection locations. The bolt connections 60 are described in greater detail below.

FIGS. 6 and 7 depict a bolt connection assembly 60 in accordance with aspects of the invention. The bolt connection assembly 60 is particularly suited for connecting components of a lattice structure wind tower 48, as depicted in FIGS. 2 and 3. The bolt connection assembly 60 is not, however, limited to this particular use, and may have utility in various other applications, such as bridge construction, building construction, and so forth.

Referring again to FIGS. 6 and 7, the assembly 60 includes a pin component 62 having a head 64 and a shaft 66. The head 64 and shaft 66 are not limited to any particular size or length, and the shaft 66 will have a design length for connecting together first structural component 76 and second structural component 78 of the lattice tower structure 48. The shaft 66 has a length so as to extend into the aligned bores 74 of the structural component 76, 78, with the shaft 66 extending at least partly into the bore 74 of the second structural component 78.

The shaft 66 of the pin component 62 includes a textured friction-fit outer circumferential surface 68. This surface 68 may be defined in various ways. In the illustrated embodiment, the surface 68 is defined as a chamfered surface. Other friction-inducing surfaces are also within the scope and spirit of the invention. The shaft 66 has a diameter such that the textured surface 68 forms a relatively tight friction fit within the aligned bores 74 of the structural components 76, 78 and prevents relative rotation of the pin component 62 within the bores 74.

Referring particularly to FIG. 7, the pin component 62 also includes a threaded internal bore 70 within the shaft 66. This threaded bore 70 extends from the terminal end 72 of the shaft 66 towards to head 64. The bore 70 need not extend completely to the head 64. In certain embodiments, however, the bore 70 may extend completely through the shaft 66.

The assembly 60 further includes a bolt component 80 having a head 84 (with washer 86) and a threaded shaft 82. The threaded shaft 82 engages within the internal threaded bore 70 of the pin component 62, as depicted in FIG. 7. Referring to FIG. 7, in an assembled state of the pin component 62 and bolt component 80, the threaded shaft 82 has a significantly increased free length section 28 as compared to the prior art configuration of FIGS. 4 and 5. This increased free length section 28 provides for an enhanced and increased distribution of the required specified pretension placed on the bolt component 80 in the assembled state of the bolt assembly 60.

The comparison of the present bolt assembly 60 with the prior art configuration of FIG. 5 and FIG. 7 shows that the shaft 66 of the pin component 62 may have a length so as to have generally the same interference friction fit length 26 between the shaft 66 and structural component 76, 78 as in the prior art configuration, while still providing the significantly increased free length 28 discussed above. In this regard, the pin component shaft 66 may extend at least about halfway into the second structural component 78, while the threaded shaft 82 of the bolt component 80 engages at least about half the length of the pin component shaft 66 in an assembled state, as depicted in FIG. 7.

It should be readily appreciated that the present invention also encompasses a wind turbine lattice tower structure 48, as depicted in FIGS. 1 through 3, that incorporates the bolt connection assembly 60 as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine lattice tower structure, comprising:
a plurality of structural members connected together to define an open lattice tower;
a plurality of bolt connection assemblies at connection junctures of said structural members, said bolt connection assemblies further comprising:
a pin component having a head and a shaft, said shaft comprising a textured friction-fit outermost circumferential surface of said pin component that extends through a respective said structural member;
said shaft extending through and frictionally engaging within aligned through holes of first and second adjacent said structural members;
said shaft further comprising a threaded internal bore, said threaded internal bore having threading that extends to a distal terminal end of said shaft such that said shaft does not extend beyond said threading of said threaded internal bore;
a bolt component having a head and a threaded shaft that engages within said threaded internal bore, said threaded shaft having a constant diameter and extending to said head of said bolt component, said head further comprising a washer surface configured to lie flush against the lattice structure structural member through which said bolt component is inserted; and wherein said terminal end of said pin component spaced from said head of said bolt component and said threaded shaft comprising a free length section that extends into said threaded internal bore for increased distribution of a specified pretension of said bolt component.

2. The wind turbine lattice tower structure as in claim 1, wherein said textured outer circumferential surface comprises a chamfered surface that frictionally engages and creates an interference fit connection within said through holes.

3. The wind turbine lattice tower structure as in claim 1, wherein said terminal end of said pin component extends through said through hole of said first structural component and into said through hole of adjacent second structural component.

4. The wind turbine lattice structure as in claim 3, wherein said pin component shaft and said bolt component threaded shaft have respective lengths such that said threaded shaft engages at least half the length of said pin component shaft in an assembled state of said bolt connection assembly with said first and second structural components.

* * * * *